Aug. 30, 1932.  H. McCORNACK  1,875,083
PULSATOR
Filed April 17, 1928  3 Sheets-Sheet 1
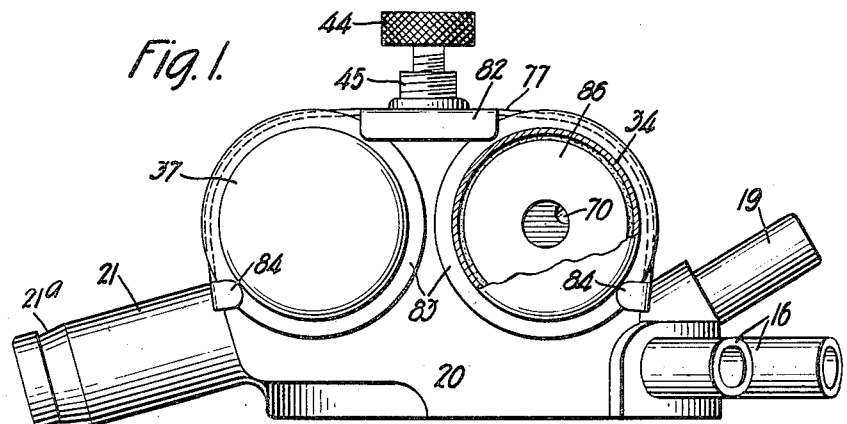
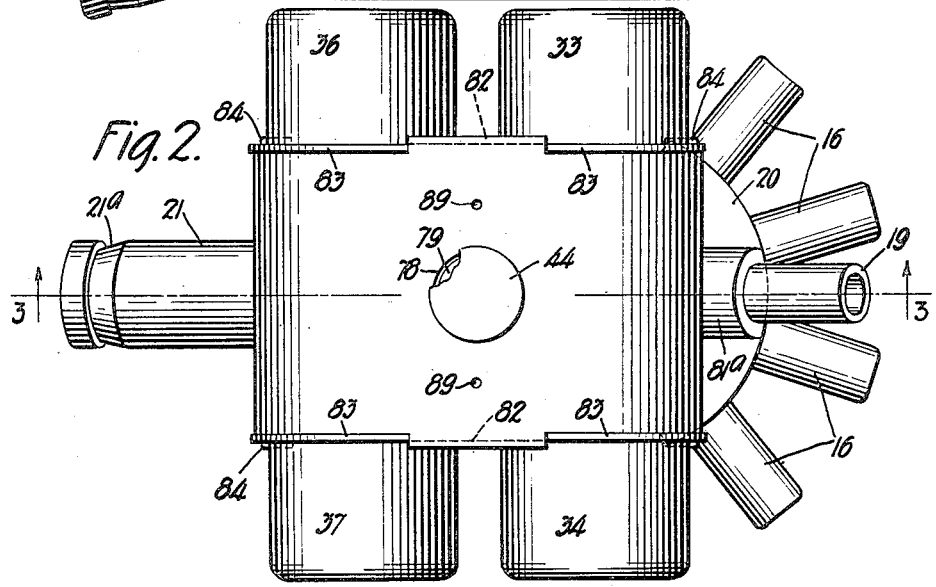
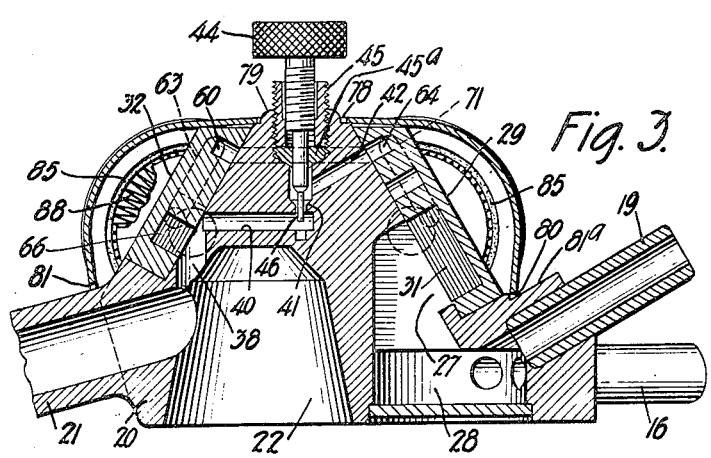
INVENTOR
Herbert McCornack
BY Moses & Nolte
ATTORNEYS

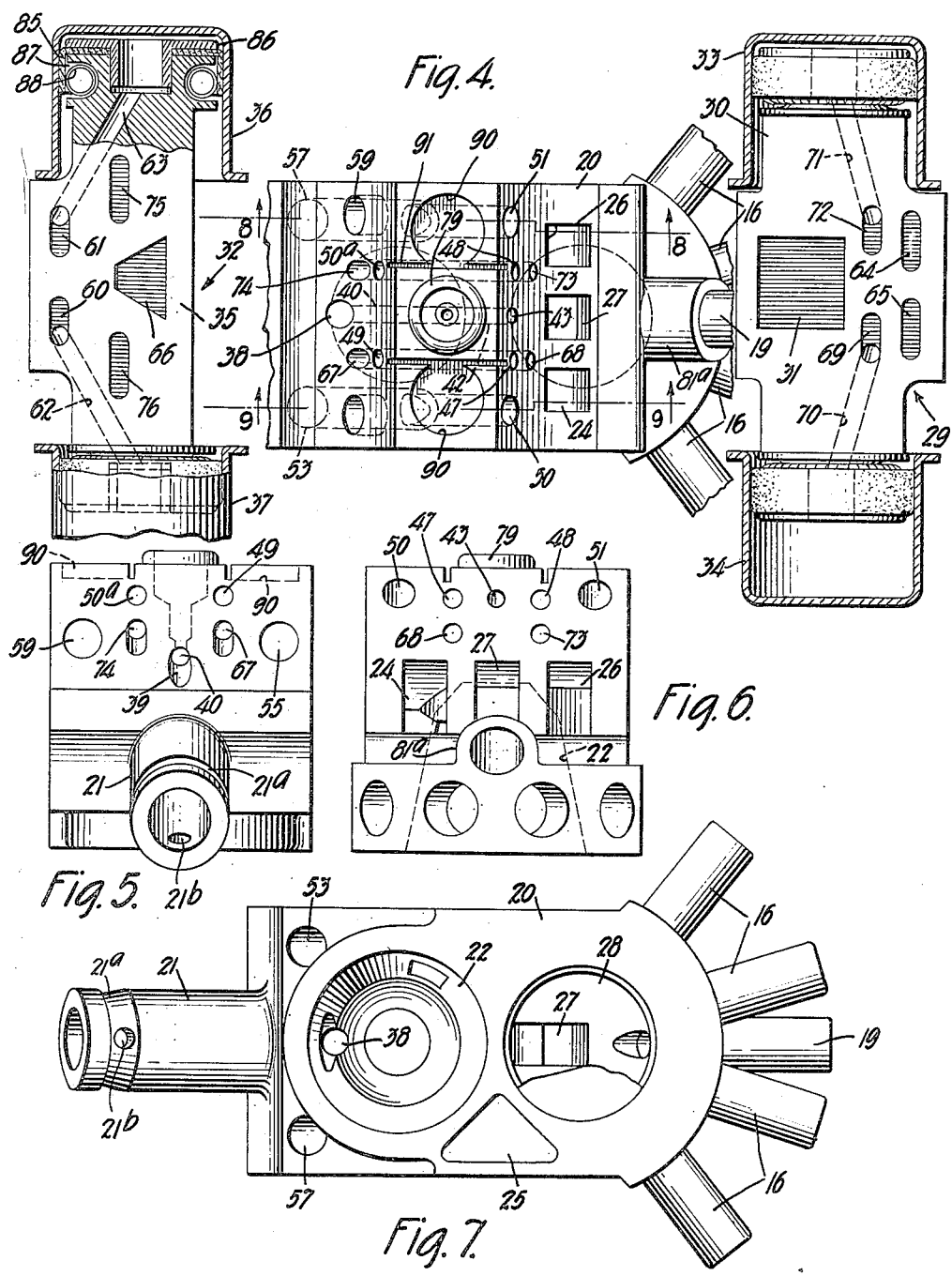

Aug. 30, 1932.  H. McCORNACK  1,875,083
PULSATOR
Filed April 17, 1928   3 Sheets-Sheet 3
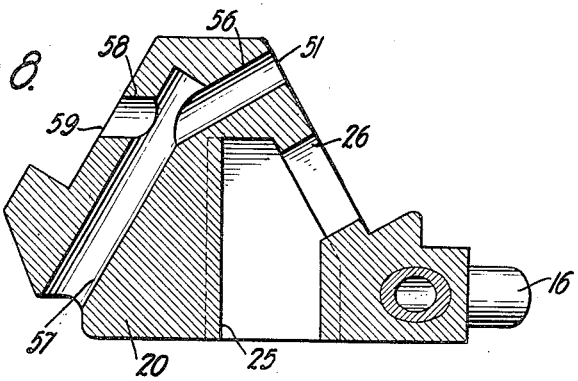
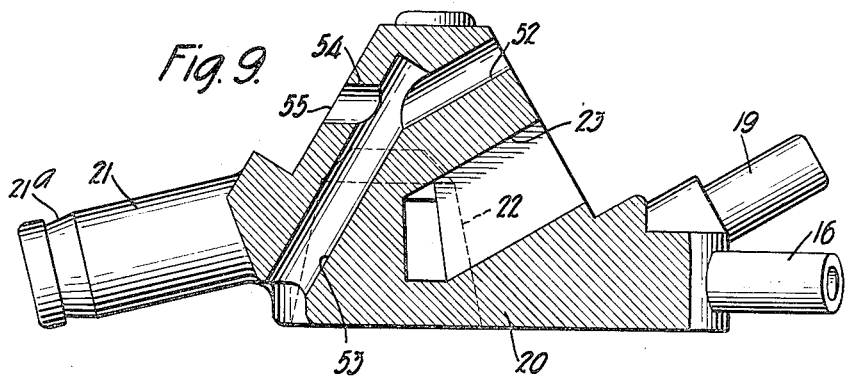
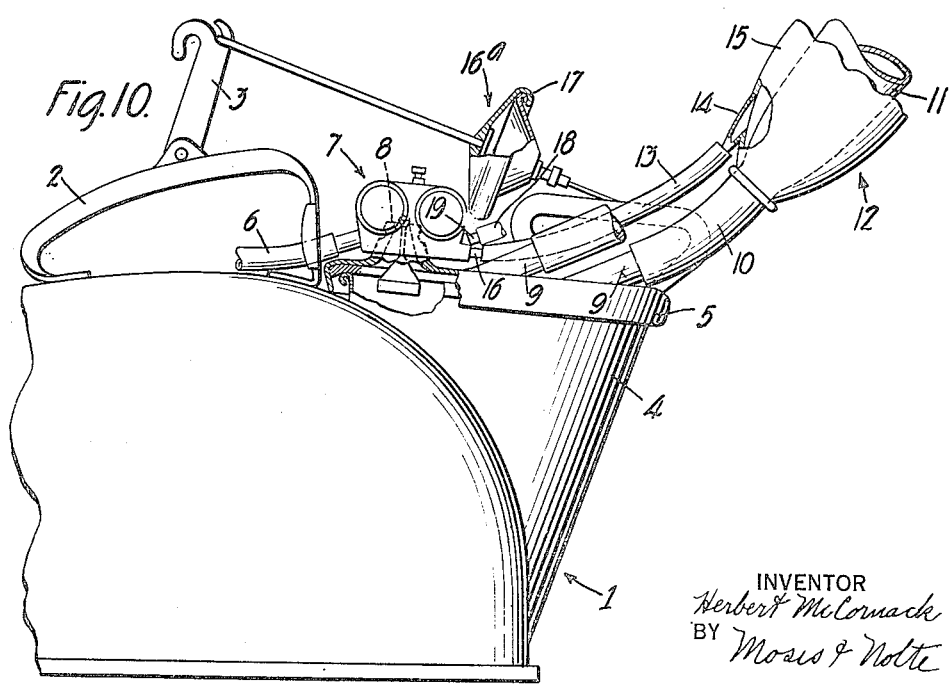
INVENTOR
Herbert McCornack
BY Moses & Nolte
ATTORNEYS Patented Aug. 30, 1932

1,875,083

UNITED STATES PATENT OFFICE

HERBERT McCORNACK, OF GLEN RIDGE, NEW JERSEY

PULSATOR

Application filed April 17, 1928. Serial No. 270,654.

This invention relates to milking machines, and more particularly to pulsators therefor of the type which operate alternately to apply suction and atmospheric pressure to the teat cups of the milking apparatus.

The general purpose of the invention is to provide pulsator mechanism which is positive and efficient in its operation, and which is simple in its construction and in the manufacture and assemblage of its several parts. It is also a purpose of the invention to so construct the apparatus that the several parts thereof may be removed quickly and readily when it is desired to have access thereto for any reason, as, for example, for cleaning or repairing. The invention has for a further object to provide an apparatus of this type which is durable in use and in which leakage from wear is prevented.

A further object of the invention is to provide in an apparatus of this kind means for positively limiting the maximum frequency of operation for which the apparatus can be adjusted.

Another important object of the invention is to provide direct passages for the motive air between the ports in the piston body and the cylinder chambers.

Another object of the invention is to provide means for preventing leakage around the regulating valve of the pulsator also for preventing the regulating valve from changing adjustment.

This application is a continuation in part of my copending application, Serial No. 403,013, filed August 12, 1920, for Pulsator for milking machines, now Patent No. 1,682,392.

Other objects and advantages will hereinafter appear.

In the accompanying drawings forming part of this specification:

Figure 1 is a side elevation of the pulsator mechanism, partly broken away;

Figure 2 is a plan view of the pulsator mechanism;

Figure 3 is a vertical, longitudinal, sectional view taken on the line 3—3 of Figure 2 and looking in the direction of the arrows;

Figure 4 is a plan view of the pulsator body with the pistons and cylinders laid alongside, the latter parts being in part broken away;

Figure 5 is a rear elevation of the pulsator body;

Figure 6 is a front elevation of the pulsator body;

Figure 7 is a bottom plan view of the pulsator body;

Figure 8 is a vertical section on the line 8—8 of Figure 4 looking in the direction of the arrows;

Figure 9 is a vertical, sectional view on the line 9—9 of Figure 4 looking in the direction of the arrows; and Figure 10 is a fragmentary view of the milk bucket and other parts of the milking machine showing the pulsator assembled therewith.

The illustrative apparatus is of the kind disclosed in my pending application Serial No. 211,886, filed August 10, 1927, entitled "Milking machines", and the features of the present invention are in the nature of improvements upon the invention disclosed in my pending application Serial No. 403,013, filed August 12, 1920 entitled "Pulsator for milking machines". Such apparatus comprises a milk bucket 1 having a handle 2 to which a hook 3 is pivotally connected, said hook being employed for suspending the bucket from the body of the cow by means of a surcingle. The milk bucket includes a spout 4 on which a cover 5 is seated. A hose 6, connected with a vacuum pump or other source of suction, communicates directly with the interior of the bucket through a pulsator mechanism 7 which is mounted upon a boss 8 on the bucket cover. The boss 8 has a passage extending therethrough, to the interior of the bucket, whereby a steady vacuum is maintained in the bucket. The bucket cover 5 is provided with nipples 9 which are connected through short, flexible milk tubes 10 with rubber inflations 11 that divide the teat cups 12 into inner and outer chambers.

By the means described, a steady vacuum is maintained within the inflations of the teat cups. Suction is intermittently applied to the chambers of the teat cups to cause the inflations to expand and contract alternately, the intermittent application of the suction being controlled by the pulsator mechanism, as will more fully appear. Short, flexible tubes 13, connected at their opposite ends respectively to nipples 14 on the teat cup casings 15 and to nipples 16 of the pulsator, establish communication between the pulsator and the outer chambers of the teat cups.

As pointed out in my application Serial No. 211,886, filed August 10, 1927, for Milking machines, referred to above, provision is desirably made of an oscillator 16a for causing the bucket to rock to and fro to exert an intermittent pull upon the teats and udder as the milking proceeds. The oscillator comprises a diaphragm box 17 which is operated by the alternate application of suction and atmospheric pressure in the diaphragm box. The suction and air for operating the oscillator are controlled from the pulsator and transmitted to the diaphragm box through a flexible tube 18 which is connected to a nipple 19 of the pulsator.

It will be evident from the foregoing outline of the general construction and operation of the apparatus that the function of the pulsator is to control the connection of the diaphragm box 17 and of the outer chambers of the teat cups to the source of suction and to the atmosphere alternately.

The pulsator comprises a chest or body portion 20 having a nipple 21 which is connected to the source of suction through the flexible tube 6. The nipple 21 is provided near the outer end thereof with a circumferential channel or groove 21a, which groove terminates in an outer, abrupt shoulder. An opening 21b lets through the nipple at the base of the groove so that when the hose 6 is applied over the end of the nipple and the apparatus is in operation, the suction is transmitted to the groove and acts to deform the hose 6 by drawing it into the groove. The hose and nipple are thus very securely connected when the apparatus is in use but may be readily disconnected when the suction is cut off.

The passage through the nipple 21 communicates at its inner end with a recess 22 adapted to receive the boss 8 of the bucket cover and to transmit the suction through the passage in the boss to the interior of the bucket. A passage 23 extends forwardly from the recess 22 to form a suction port 24 in the forward inclined face of the pulsator body. A passage 25, open to the atmosphere, extends upwardly through the pulsator body and terminates in an air port 26 in the forward inclined face of the pulsator body. Between the ports 24 and 26 there is a port 27 in communication with a distributor chamber 28. This chamber is connected through the nipples 16 and 19 with the outer teat cup chambers and with the diaphragm box 17, respectively. It is the purpose of the pulsator to place the port 27 alternately in communication with the suction port 24 and with the air port 26 so that suction and atmospheric pressure will alternately be applied in the chamber 28 to produce the pulsations and to operate the oscillator. It is desirable that the change from suction to pressure and from pressure to suction in the chamber 28 be accomplished quickly and that the pulsations can be produced with the desired frequency, and that provision be made of adjustable means for controlling the frequency of the pulsations.

The pulsator is provided with a piston 29 having a valve body 30 slidable to and fro upon the forward inclined end face of the pulsator body. The body 30 is provided with a pocket or recess 31 which is effective to place the port 27 in communication alternately with the ports 24 and 26 as the piston slides to and fro.

The pulsator comprises means for utilizing the suction to produce a to and fro movement of the piston 29 and to control the frequency of such movements of the piston. For cooperating in achieving this result, provision is made of a second piston 32 at the opposite or rear side of the pulsator body, which also slides to and fro and which, in conjunction with certain passages in the operating piston 29, controls the alternate connection of cylinder heads 33 and 34 with the source of suction and with the air. Suitable passages through the pulsator body cooperate with recesses in the operating piston 29 and with passages through the valve body 35 of control piston 32 to cause cylinder heads 36 and 37 also to be connected with the air and with the source of suction alternately.

Each of the slidable valve bodies 29 and 32 has two opposed piston heads attached rigidly or integrally therewith. This integral construction of the valve and piston bodies in this device makes possible the air ducts which provide for the flow of the motive air directly through the valve and piston bodies between the ports in the pulsator body and their corresponding cylinder chambers.

The bore through the nipple 21 communicates at its inner end with an upwardly extending passage 38 which extends through the pulsator body to provide a port 39 in the rear inclined face of the body for a purpose which will be pointed out a little later on. The passage 38 also communicates with a forwardly extending passage 40 and the channel of communication is continued through an upwardly extending passage 41 and a forwardly extending passage 42 which terminates in a suction port 43 in the forward inclined face of the pulsator body.

It will be observed that the passage 41 is a very restricted passage and that it is provided with a valve seat whereon a needle valve 44 may be caused to seat. As will be more clearly evident from the later description, the rate of flow through the restricted passage 41 controls the frequency of operation of the pulsator. The faster the flow through the passage 41, the faster the operation of the pulsator will be.

If the pulsations are run up to an excessive frequency, the efficiency of the entire mechanism will be impaired for the reason that the rubber inflations of the teat cups are not quickly enough responsive to operate satisfactorily at high frequencies. The needle valve 44 which is adjustably mounted in a threaded bushing 45, is therefore provided with a downwardly extending stem 46 which is of such length that it necessarily extends through the passage 41 in every operative position of the needle valve, to definitely limit the maximum rate of flow of air through the passage.

A gland of leather or some other compressible material 45a surrounds the shank or body of the needle valve 44 and is pressed against a conical seat in the pulsator body by the threaded bushing 45. The bushing and the conical seat cooperate to press the gland firmly against the stem of the needle valve so that leakage around the needle valve is prevented. This is an important feature for the reason that leakage results both in a waste of power and in changing the speed of the pulsator from that desired. The gland, being compressed against the smooth part of the needle valve stem by the bushing and the opposing conical seat, serves also to frictionally grip the needle valve and therefore to prevent the needle valve from creeping out of adjustment when the pulsator is in operation. The degree of frictional resistance to turning of the needle valve may be nicely regulated by adjustment of the bushing. The leather gland exerts in inert force upon the needle valve, that is, it is put under no stress tending to turn the needle valve from the desired adjustment. Neither does it require to be loosened and retightened like the usual lock-nut in order to effect an adjustment of the needle valve. The gland, therefore, makes possible a quick and precise adjustment of the needle valve which can be effected with one hand of the operator.

At opposite sides of the port 43 in the forward face of the pulsator body, provision is made of ports 47 and 48 which communicate with ports 49 and 50a respectively in the opposite or rear face of the pulsator body. Air ports 50 and 51 are located in the front face of the pulsator body in horizontal alignment with the ports 47 and 48. Air port 50 communicates through passages 52 and 53 with the atmosphere, and atmospheric passage 53 also communicates through a passage 54 with an air port 55 in the rear face of the pulsator body. Air port 51 likewise communicates through passages 56 and 57 with the atmosphere and the atmospheric passage 57 also communicates through a passage 58 with an air port 59 in the rear face of the pulsator body.

Control piston 32 is provided with elongated recesses 60 and 61 which through the respective passages 62 and 63 in the piston body 35 maintain the cylinders 37 and 36 respectively in communication with the ports 49 and 50a.

If it be assumed that the operating piston 29 is initially at the right hand extremity of its operating movement, as illustrated in Figure 4, the port 48 is then put in communication with air port 51 through an elongated slot 64 in the body 30 of operating piston 29, and the port 47 is put in communication with suction port 43 through an elongated slot 65 in piston body 30. The suction transmitted through port 47 will be transmitted through port 49, recess 60 and passage 62 to cylinder head 37, and will tend to draw control piston 32 toward the left. At the same time, air will be communicated through port 48, port 50a, recess 61 and passage 63 to cylinder head 36 so that the piston will be free to move toward the left in response to the suction in cylinder head 37. As the piston 32 nears the end of its movement toward the left, a trapezoidal recess 66 in piston body 35 is carried toward the left to place suction port 39 in communication with a port 67 that communicates with a port 68 in the front face of the pulsator body. An elongated recess 69 maintains port 68 in communication with cylinder head 34 through a passage 70 that extends through the piston. The suction thus transmitted to the cylinder head 34 tends to draw the piston 29 toward the left, and such movement is permitted for the reason that cylinder head 33 is now in communication with the atmosphere. The line of communication includes a passage 71 and a recess 72 in the piston body 30 and a port 73 in the front face of the pulsator body which communicates with a port 74 in the rear face of the pulsator body. An elongated recess 75 in the body 35 of control piston 32 connects port 74 with air port 59 and completes the line of communication between cylinder head 33 and the atmosphere.

The movement of piston 29 will be effected very quickly because the transmission of suction and of atmospheric air to the cylinder heads 33 and 34 is unrestricted and all of the passages for establishing the communication to these cylinder heads are relatively large.

As soon as the operating piston 29 completes its movement toward the left, the conditions which caused control piston 32 to move toward the left are reversed. Recess 65 in piston 29 now places port 47 in communication with air port 50, and hence cylinder head 37 in communication with the atmosphere. At the same time recess 64 in piston 29 places port 48 in communication with suction port 43, and hence places cylinder head 36 in communication with the source of suction. The piston 32 is therefore drawn toward the right, though much more slowly than piston 29 was moved, and at a rate controlled by the adjustment of the needle valve.

As the piston 32 moves toward the right it moves recess 66 out of registration with port 67 and into position to connect suction port 39 with port 74 to place cylinder head 33 in communication with the source of suction. At the same time an elongated recess 76 in the body 35 of control piston 32 places port 67 in communication with air port 55 to admit air to cylinder head 34. A quick reversal of piston 29 to its right hand position, as seen in Figure 4, is thereupon effected. This completes the cycle, all of the parts being once more in the positions illustrated in Figure 4.

During the operation of the pistons the valve bodies thereof are caused to press firmly upon the inclined front and rear faces of the pulsator body by gravity and they are also constantly drawn toward such faces by suction so that leakage between the relatively moving parts is prevented. The cylinder heads 33, 34, 36 and 37 are not rigidly secured to the pulsator body, but are floatingly carried by the pistons so that they will be carried down by the pistons as the valve bodies of the pistons and the pulsator body wear down, and will, therefore, always remain concentric with the pistons. As the cylinder heads are free to move down with the pistons, they do not restrain the pistons from shifting downward as the relatively moving parts wear, and hence they do not tend to promote leakage between the valve bodies of the pistons and the pulsator body.

All four of the cylinder heads 33, 34, 36 and 37 are retained in assembled position by means of a resilient, curved retaining plate 77 snapped about the cylinders. This retaining plate is positioned relatively to the pulsator body by means of a central aperture 78 therein which surrounds a central boss 79 on the pulsator body, and by means of notches 80 and 81 therein which partially surround respectively a boss 81a at the front of the pulsator body and the nipple 21 at the rear of the pulsator body. The plate 77 is provided with central side flanges 82 which engage the outer faces of flanges 83 on the cylinder heads and fingers 84 which also engage the outer faces of the flanges 83. The flanges 82 and the fingers 84 are so disposed that each of the cylinder head flanges is engaged at substantially diametrically opposite points by a finger 84 and by one end of a flange 82. The fingers 84 and the flanges 82 prevent outward longitudinal displacement of the cylinder heads, and the pulsator body, by engagement with the inner faces of the flanges 83 prevent inward displacement of the cylinder heads. The removal of the plate 77 is normally prevented by the head of needle valve 44, which head is of too great diameter to pass through the aperture 78 of the plate 77. When it is desired, however, to remove the cylinders and pistons, it is only necessary to remove the needle valve in order to permit the entire cylinder and piston assembly to be lifted off and disassembled.

The piston heads are alike in construction, and a description of one of them will therefore suffice for all. Each piston head is provided with a cupped leather washer 85 which is retained between the end face of the piston body and a flanged sleeve member 86. The sleeve portion of this member is driven into a central bore of the piston body and serves to communicate suction to the cylinder head, while the flanged portion substantially covers the piston head and clamps the leather washer firmly thereto. The piston head is formed with a circumferential groove 87 at a short distance back from its end, and a coil spring 88 is seated in this groove to bear against the flanged portion of the leather washer and maintain such flanged portion of the washer always in engagement with the lateral walls of the cylinder head.

For the purpose of lubricating the relatively moving parts, provision is made of oil holes 89 in the retaining or cover plate 77. These oil holes overlie shallow recesses 90 in the pulsator body, which recesses communicate by means of channels 91 with the front and rear inclined faces of the pulsator body. The oil thus introduced is not only effective to lubricate the faces of the pulsator body and the piston bodies sliding thereon but the oil is also carried by suction to the cylinder heads and serves to lubricate the cupped leather washers 85.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

I claim:

1. A pulsator mechanism for milking apparatus, including in combination, a pulsator body adapted to be removably connected to a receptacle cover, a piston having a valve body slidable on the pulsator body, removable cylinder heads cooperating with the piston and supported thereby, and a common removable s..ap holder spanning the pulsator body and retaining the cylinder heads against separation therefrom.

2. A pulsator mechanism for milking apparatus, including in combination, a pulsator body having opposed inclined faces, an operating piston having a valve body engaging one of said faces, a control piston having a valve body engaging the other of said faces, said pistons being held to the pulsator body by suction and gravity, and removable cylinder heads supported by each piston at opposite ends thereof.

3. A pulsator mechanism for milking apparatus, including in combination, a pulsator body having opposed inclined faces, an operating piston having a valve body engaging one of said faces, a control piston having a valve body engaging the other of said faces, cylinder heads cooperative with said pistons, said pistons being held to the pulsator body by suction and gravity, and said pulsator body being provided with passages for placing the cylinder heads cooperative with each piston in communication with the atmosphere, and a source of suction alternately to reciprocate the pistons, and means for regulating the size of the passage for placing the cylinder heads cooperative with the control piston in communication with the source of suction whereby the rate of operation of the pulsator may be regulated.

4. A pulsator mechanism for milking apparatus, including in combination, a pulsator body having opposed inclined faces, an operating piston having a valve body engaging one of said faces, a control piston having a valve body engaging the other of said faces, cylinder heads cooperative with said pistons, said pistons being held to the pulsator body by suction and gravity, and said pulsator body being provided with passages for placing the cylinder heads cooperative with each piston in communication with the atmosphere and a source of suction alternately to reciprocate the pistons, means for regulating the size of the passage for placing the cylinder heads cooperative with the control piston in communication with the source of suction whereby the rate of operation of the pulsator may be regulated, and means for mechanically limiting the maximum rate of operation of the pulsator.

5. A pulsator mechanism for milking apparatus, including in combination, a pulsator body having opposed inclined faces, an operating piston having a valve body engaging one of said faces, a control piston having a valve body engaging the other of said faces, cylinder heads cooperative with said pistons, said pistons being held to the pulsator body by suction and gravity, and said pulsator body being provided with passages for placing the cylinder heads cooperative with each piston in communication with the atmosphere and a source of suction alternately to reciprocate the pistons, means for regulating the size of the passage for placing the cylinder heads cooperative with the control piston in communication with the source of suction whereby the rate of operation of the pulsator may be regulated, consisting of a needle valve operable toward and from a seat, and a stem on the needle valve extending beyond the seat into an orifice, the stem being of such length that it will lie within the orifice in every operative position of the valve.

6. A pulsator mechanism for milking machinery, comprising a pulsator body having a passage constantly in communication with a source of suction, a passage constantly in communication with the atmosphere, a teat cup manifold, and a passage communicating with the manifold, an operating piston including a valve body for connecting the manifold passage with the suction and atmospheric passages alternately, cylinder heads cooperative with the operating piston, means for placing said cylinder heads alternately in communication with the source of suction and with the atmosphere to reciprocate the piston, comprising a control piston including a valve body, cylinder heads cooperating with the control piston, and means for placing the latter cylinder heads alternately in communication with the source of suction and with the atmosphere, including the operating piston, a passage through the pulsator body, and a manually adjustable valve controlling the rate at which the air may be exhausted from the cylinder heads that cooperate with the control piston, the passages communicating with the cylinder heads cooperative with the operating piston being unrestricted and relatively large.

7. In a pulsator mechanism, in combination, a pulsator body, pistons having valve bodies integral therewith and slidable upon said pulsator body, cylinders at opposing ends of said pistons, and supported thereby, said pulsator body having ports therein and said valve bodies having ports cooperative with the first mentioned ports and also having passages extended through the pistons into communication with the cylinders which communicate the air directly between said valve ports and the cylinder chambers at the opposing ends of said pistons.

8. In a pulsator mechanism for milking apparatus comprising a chamber adapted to be placed alternately in communication with the atmosphere and with a source of suction in combination, a body having, a passage in communication with the source of suction and adapted to be placed in communication with said chamber, and a valve controlling said passage and adjustable to regulate the rate at which said chamber may be exhausted, said valve including an extension stem which remains in the passage in every operative position of the valve for positively limiting the maximum rate at which the chamber may be exhausted.

In testimony whereof I have affixed my signature to this specification.

HERBERT McCORNACK.